(12) United States Patent
Hakamada

(10) Patent No.: US 8,649,062 B2
(45) Date of Patent: Feb. 11, 2014

(54) IMAGE PROCESSOR

(75) Inventor: Junichi Hakamada, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 164 days.

(21) Appl. No.: 13/432,407

(22) Filed: Mar. 28, 2012

(65) Prior Publication Data
US 2012/0250096 A1 Oct. 4, 2012

(30) Foreign Application Priority Data
Mar. 31, 2011 (JP) ................. P2011-079734

(51) Int. Cl.
*H04N 1/405* (2006.01)
*G06K 9/00* (2006.01)

(52) U.S. Cl.
USPC .................. 358/3.13; 382/162; 382/167

(58) Field of Classification Search
USPC ............... 358/3.13, 1.2, 1.9, 3.26, 524, 525; 382/162, 167; 708/3; 345/596
See application file for complete search history.

(56) References Cited

U.S. PATENT DOCUMENTS

| | | | |
|---|---|---|---|
| 4,651,293 A * | 3/1987 | Kato | 708/3 |
| 5,875,287 A * | 2/1999 | Li et al. | 358/1.2 |
| 8,471,864 B2 * | 6/2013 | Aonuma | 345/596 |
| 8,478,030 B2 * | 7/2013 | Une et al. | 382/162 |

FOREIGN PATENT DOCUMENTS

JP 07-290737 A 11/1995

* cited by examiner

*Primary Examiner* — Charlotte M Baker
(74) *Attorney, Agent, or Firm* — Nath, Goldberg & Meyer; Jerald L. Meyer; Lakshmi Rajan (57) ABSTRACT

An image processor includes a tone converter operable when a pixel of input image data is determined as having a value greater in color saturation than a prescribed saturation value. In this operation, the tone converter changes a threshold for each color in a dither matrix associated with the pixel to make the thresholds different in correspondence to color component values of the pixel. The tone converter generates color component values of the pixel constituting image data to be output, based on comparisons between the respective color component values and the changed thresholds.

5 Claims, 8 Drawing Sheets

COORDINATES IN X DIRECTION

| | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| COORDINATES IN Y DIRECTION | 0 | 129 | 178 | 95 | 149 | 26 | 57 | 249 | 45 | 231 | 157 | 200 | 134 | 3 | 206 | 61 | 229 |
| | 1 | 198 | 71 | 1 | 224 | 205 | 103 | 172 | 7 | 122 | 58 | 35 | 222 | 115 | 87 | 154 | 28 |
| | 2 | 107 | 246 | 160 | 120 | 65 | 143 | 236 | 97 | 214 | 180 | 93 | 174 | 11 | 254 | 177 | 47 |
| | 3 | 140 | 36 | 60 | 188 | 16 | 197 | 33 | 70 | 145 | 20 | 241 | 151 | 62 | 125 | 77 | 233 |
| | 4 | 91 | 168 | 213 | 101 | 252 | 92 | 131 | 225 | 193 | 54 | 105 | 39 | 203 | 216 | 18 | 185 |
| | 5 | 220 | 8 | 126 | 23 | 156 | 42 | 167 | 4 | 114 | 166 | 250 | 135 | 83 | 158 | 116 | 43 |
| | 6 | 148 | 78 | 182 | 238 | 74 | 217 | 191 | 86 | 230 | 73 | 27 | 184 | 5 | 196 | 63 | 243 |
| | 7 | 25 | 202 | 104 | 44 | 147 | 110 | 59 | 141 | 13 | 155 | 212 | 112 | 56 | 227 | 94 | 130 |
| | 8 | 248 | 67 | 163 | 232 | 10 | 209 | 29 | 244 | 201 | 100 | 49 | 239 | 139 | 165 | 14 | 189 |
| | 9 | 144 | 34 | 118 | 90 | 186 | 128 | 82 | 173 | 123 | 37 | 179 | 80 | 31 | 204 | 121 | 48 |
| | 10 | 210 | 176 | 221 | 2 | 69 | 255 | 159 | 21 | 64 | 223 | 146 | 253 | 109 | 66 | 235 | 85 |
| | 11 | 102 | 55 | 127 | 199 | 152 | 40 | 108 | 234 | 195 | 98 | 0 | 169 | 17 | 192 | 153 | 6 |
| | 12 | 170 | 251 | 19 | 96 | 228 | 52 | 181 | 76 | 137 | 46 | 124 | 75 | 218 | 132 | 51 | 226 |
| | 13 | 32 | 138 | 72 | 175 | 133 | 89 | 207 | 9 | 164 | 247 | 208 | 183 | 41 | 84 | 187 | 117 |
| | 14 | 79 | 161 | 215 | 38 | 242 | 15 | 119 | 219 | 30 | 111 | 22 | 150 | 106 | 245 | 24 | 211 |
| | 15 | 12 | 240 | 50 | 113 | 194 | 162 | 81 | 136 | 190 | 68 | 88 | 237 | 53 | 171 | 142 | 99 |

OUTPUT IMAGE DATA ASSOCIATED WITH INPUT
IMAGE DATA HAVING 'C' COMPONENT VALUE "16",
'M' COMPONENT VALUE "32",
AND 'Y' COMPONENT VALUE "48"

FIG. 8

OUTPUT IMAGE DATA ASSOCIATED WITH INPUT IMAGE DATA
HAVING 'C' COMPONENT VALUE "128",
'M' COMPONENT VALUE "144", AND 'Y' COMPONENT VALUE "160"

IMAGE PROCESSOR

BACKGROUND OF THE INVENTION

1. Technical Field

The present invention relates to image processors for providing image data to be printed at a printing device. In particular, the present invention relates to an image processor adapted to generate image data to be output based on comparisons between pixels of input image data and thresholds associated with the pixels in a dither matrix.

2. Background Arts

There have been typical known methods of using thresholds in a dither matrix for binarizing tone data of original image data to generate data representing pseudo halftones.

For binarizing colored original image data, the dither matrix employed is a dot dispersing dither matrix in which locations of dots are changed for every color component.

When this technique is applied to superimpose a plurality of colors on a dot, granular feeling is increased, and clearness due to muddy secondary colors is decreased. Moreover, in order to make the periodicity inconspicuous, it is necessary to provide a very large dither matrix requiring a large storage area in a memory.

On the other hand, there is a dot dispersing dither matrix having thresholds spatially shifted for every color component. However, in techniques employing such a dot dispersing dither matrix for binarizing colored original image data, the offset amounts are fixed, thereby limiting suppression ranges of superimposition of dots. Moreover, superimposed dots increase the quantity of ink printed per one pixel, with increase in penetration of ink through a printing sheet.

In this way, conventional techniques are subject to increase regions having different colors superimposed on a dot. This superimposition fails to produce a favorable color and reduce granular feeling. Such an inconvenient issue is unable to remove while reducing the required memory area. Japanese Patent Application Laid-Open Publication No. 7-290737 discloses a technique to solve such an issue with a reduced memory area for storing a dither matrix.

According to this technique, a basic dither matrix is stored in a memory area. The dither matrix has thresholds for application to a prescribed color component. Any threshold once applied to the prescribed color component is changed before application to a subsequent color component. This change is made in consideration of a tone value for the prescribed color component and a given maximum. Such an operation is repeated so that thresholds in a dither matrix applied to the subsequent color component are different in value from thresholds in the dither matrix applied to the prescribed color component.

Thus, despite use of a single dither matrix, which is stored in a memory, the dither matrix can be applied to respective color components and minimize superimposition of colors. This enables to suppress unclearness (with color dulling and granular feeling) due to superimposed colors in color printing.

SUMMARY OF THE INVENTION

However, the technique disclosed in the afore-mentioned patent document has the following problems. This technique is applied to binarization of colored original image data not only in regions relatively high in color saturation but also in regions relatively low in color saturation. In high-saturation regions, the superimposition of colors should be minimized to provide a color shade and suppress unclearness (with color dulling and granular feeling) due to superimposed colors in color printing. In this regard, in low-saturation regions near black or gray colors, the application of the technique is inconvenient as follows.

For instance, there are letter print regions or character image regions as typical examples of low-saturation regions near black or gray colors. In such regions, colors to be output may be essentially intended to be black or gray, or desired to be black or gray with slight reddish or bluish tints. In such a case, when C, M, and Y color components are dispersed not to superimpose on a dot in the region, pixels having hues of C color components or such looked prominent. These pixels have tints of so-called warm grays, whereby they are wholly turned black with more reddish or bluish tints than desired. Such tints are conspicuous as debasements of image quality such as those in letter print regions.

Therefore it is an object of the present invention to provide an image processor adapted to use a single stored dither matrix to control such issues. This control includes suppressing unclearness (with color dulling and granular feeling) due to superimposed colors in color printing. It further includes suppressing prominent tints, as necessary, at low-saturation regions near black or gray colors.

According to an aspect of an embodiment of the present invention, there is an image processor adapted to generate image data to be output as necessary for printing at a printing device 20. The image processor comprising: a color image determiner (243) configured to determine whether or not the input image data is color image data; a prescribed saturation determiner (244) configured to determine whether or not the respective pixels of the input image data determined as color image data by the color image determiner (243) have a value greater in color saturation than a prescribed saturation value of a composite black; a threshold changer (implemented as a threshold calculation controller 245 linked to threshold calculators 250, 251, and 252) configured to change a threshold for each color in the dither matrix associated with a pixel determined as having a value greater than the prescribed saturation value by the prescribed saturation determiner (244) to make the threshold different in correspondence to each color component value of the pixel; and a first output pixel data generator (implemented as a combination of comparators 246, 247, 248, and 249) configured to generate color component values to be output for the pixel, based on comparisons between the color component values of the pixel and the thresholds changed by the threshold changer.

DESCRIPTION OF THE EMBODIMENTS

First Embodiment

[Configuration of the Printing System]

Figure 1:
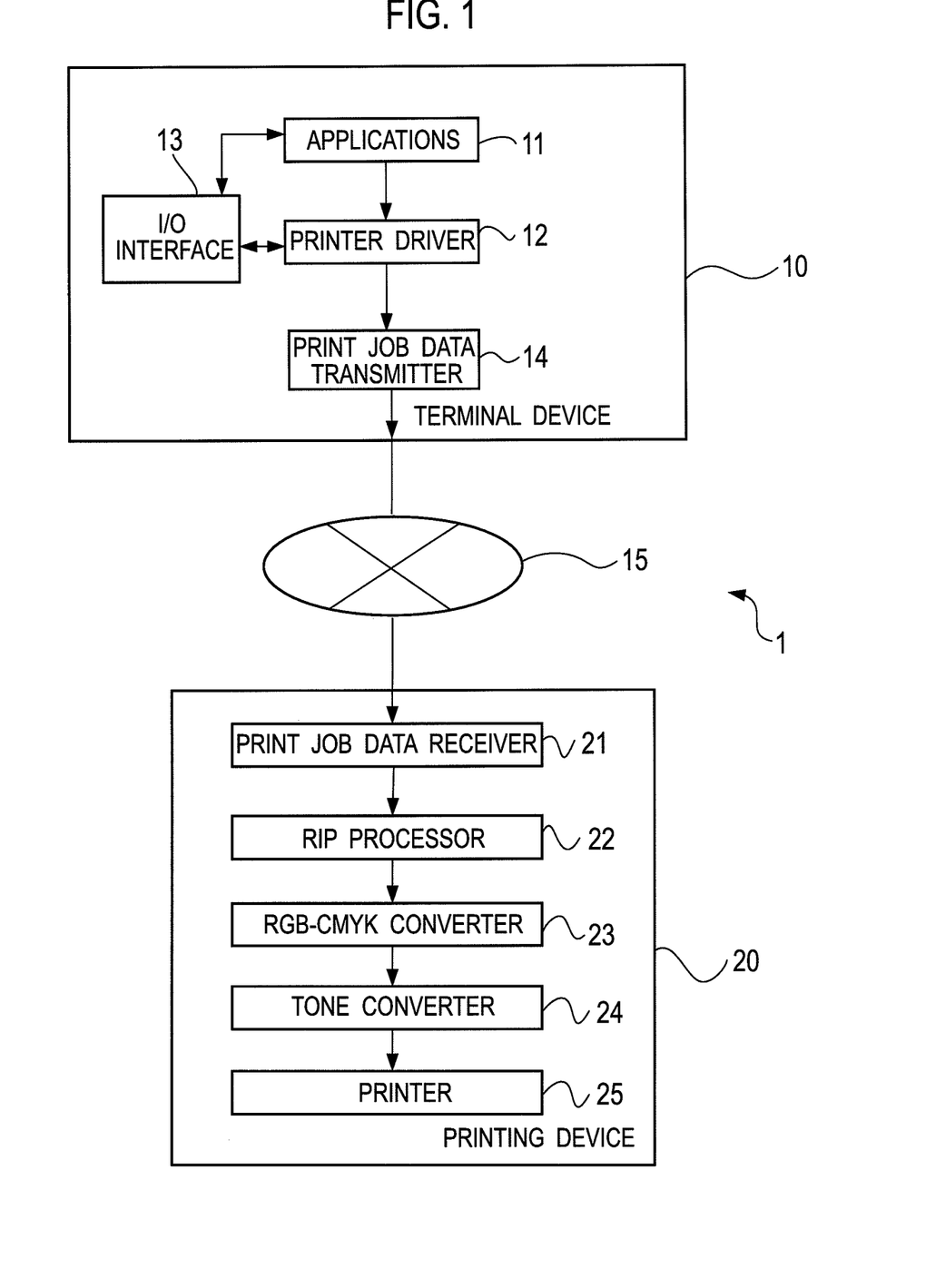
FIG. 1 is a block diagram showing a configuration of a printing system according to a first embodiment.

FIG. 1 shows a printing system 1 that includes terminal devices 10 and a printing device 20. At each terminal device 10, an operation system is incorporated to enable basic operations on user interfaces and others, and various applications are operable thereon. The terminal devices 10 are connected to the printing device 20 through a communicating subsystem 15 using a network such as a wired LAN.

(Terminal Devices)

The terminal devices 10 include applications 11, a printer driver 12, an I/O (input/output) interface 13, and a print job data transmitter 14. The printer driver 12 as well as any application 11 can be implemented by a set of programs installed in the terminal device 10 where the programs are read out and interpreted by a CPU.

The applications 11 include a program for generating data of texts such as scripts and pictures. The applications 11 are operable to output generated text data to the printer driver 12.

The I/O interface 13 has functions to input or output information. An output function of the interface 13 is employable to display to a user a series of screens such as a print setting screen or a print operational screen. An input function of the interface 13 is employable to receive data on setups made for a print by a user. Another output function of the interface 13 is employable to display to a user a set of current data including setup data and print conditions for a print. The printer driver 12 is operable to employ the input and output functions of the I/O interface 13. The printer driver 12 can serve to generate print job data (for instance, PDL data) based on script data and information set up by a user. Generated print job data is output through the print job data transmitter 14 and the communicating subsystem 15 to the printing device 20.

The I/O interface 13 has typical input functions and output functions. The input functions are implemented by a keyboard and the like. The output functions are implemented by a liquid crystal display monitor and the like. The I/O interface 13 permits a user to input various data. The I/O interface 13 is operable to output such input data to any application 11 as well as to the printer driver 12. The I/O interface 13 is further operable to receive outputs from any application 11 as well as from the printer driver 12, and inform them to a user.

For instance, the preparation of script data by an application 11 may be followed by a user's operation using the I/O interface 13 to input an instruction to print the script data as a color print. In this case, the printer driver 12 operates to include in associated print job data a piece of information that the data is color image data.

The print job data transmitter 14 is operable to receive print job data output from the printer driver 12, and transmit received print job data through the communicating subsystem 15 to the printing machine 20.

(Printing Device)

The printing device 20 includes a print job data receiver 21, a RIP processor 22, an RGB-CMYK converter 23, a tone converter (halftone processor) 24, and a printer 25.

The print job data receiver 21 is operable to receive print job data transmitted from the print job data transmitter 14.

The RIP processor 22 is operable to generate raster data on basses of print job data received at the print job data receiver 21. The received print job data is mapped into the raster data being a combination of bit maps with a prescribed resolution. The bit maps are produced for red (referred herein to as "R") components, green (referred herein to as "G") components, and blue (referred herein to as "B") components. The RIP processor 22 thus generates the raster data as "print job data in a mapped state" (referred herein to as "mapped print job data"). This mapped print job data is formatted as an array of pixels spread (in correspondence to coordinate positions allocated in the raster data) in the prescribed resolution. Each pixel is associated with a combination of values of R, G, and B components. The R component value, G component value, and B component value are respectively variable within a range (for instance, '0' to '255'). It is noted that the mapped print job data is related to the piece of information included in the print job data as an instruction for a color printing.

The RGB-CMYK converter 23 is operable to make an RGB-to-CMYK conversion. Mapped print job data generated at the RIP processor 22 is defined in an RGB color system that has three components being R, G, and B components. The RGB-to-CMYK conversion converts the mapped print job data defined in the RGB system into mapped print job data defined in a CMYK color system that has four components. That is, the CMYK system has a cyan (referred herein to as C) component, a magenta (referred herein to as M) component, a yellow (referred herein to as Y) component, and a black (referred herein to as K) component. In the CMYK system, the mapped print job data is formatted as a combination of four arrays of pixels separated by the C, M, Y, and K components and spread in the same resolution as the above-noted prescribed resolution. In any pixel array, each pixel has a position (Xi, Yj: refer to FIG. 3) defined by row and column coordinates of a matrix set up to be common among the four arrays. Each position defined by such matrix coordinates corresponds to a raster coordinate position (I, J: refer to FIG. 2) in the mapped print job data. At any pixel, the matrix coordinate position is associated with one of a C component value, an M component value, a Y component value, and a K component value. The C component value, M component value, Y component value, and K component value are all variable within a range (for instance, '0' to '255'). It is noted that in color image data the C, M, Y, and K components are related to the piece of information given as an instruction for a color printing.

The RGB-CMYK converter 23 thus produces mapped print job data composed of C, M, Y, and K components. These components represent their color tones defined within a number of tones. Such mapped print job data is input as image data to the tone converter 24. The tone converter 24 is operable to make a tone conversion of input image data to provide image data to be output. By this conversion, the image data input with color component values defined within a tone number is converted into the image data to be output with color component values defined within a tone number smaller than the tone number of the input image data. In this example of embodiment, the tone converter 24 is implemented to provide image data to be output with components defined in binary tones that have two values being '0' and '1'. Description is now made of this example.

Figure 2:
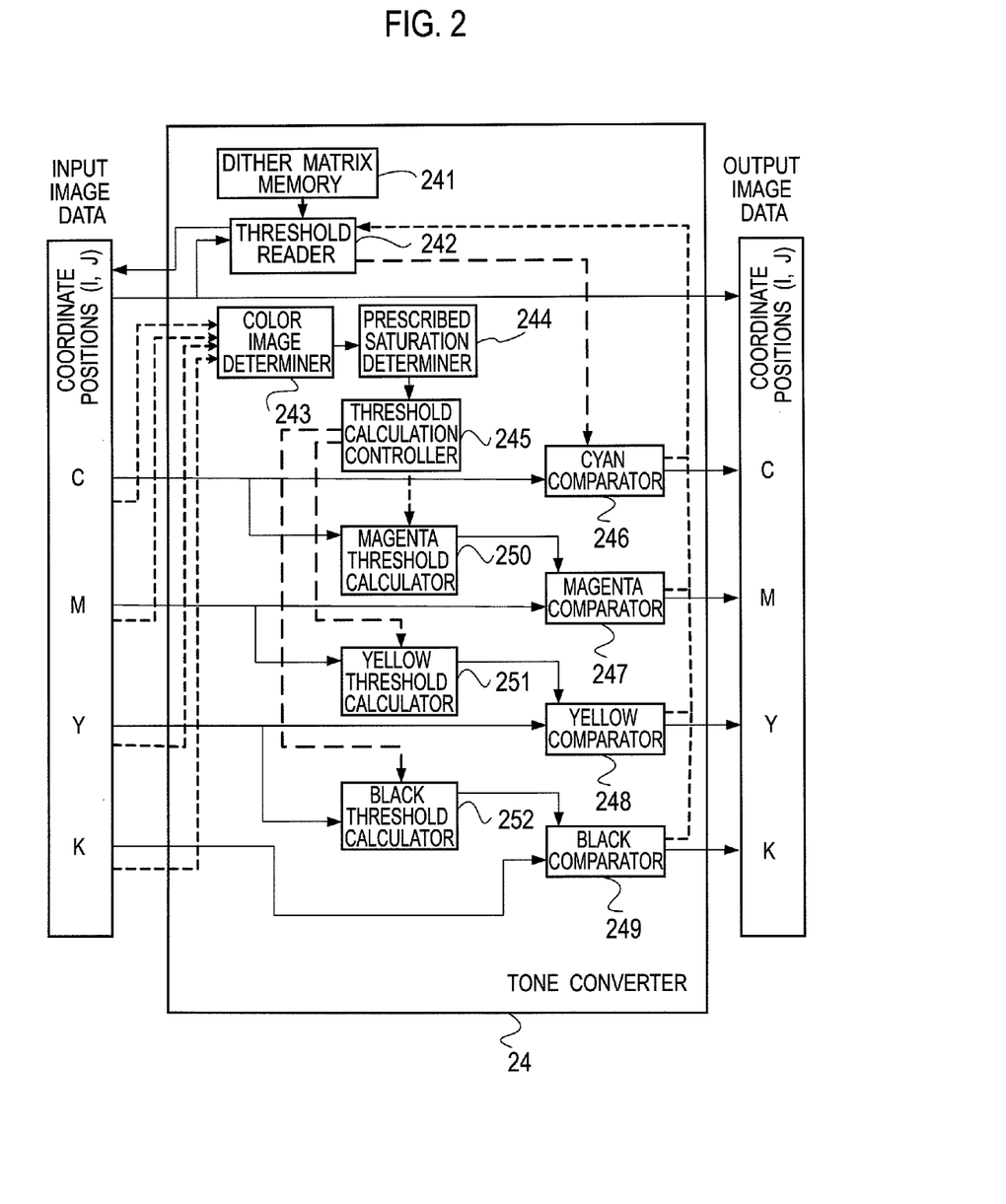
FIG. 2 is a block diagram showing a configuration of a tone converter according to the first embodiment.

As shown in FIG. 2, the tone converter 24 includes a color image determiner 243, and a prescribed saturation determiner 244 linked with the color image determiner 243. The tone converter 24 further includes a threshold calculation controller 245 linked with the prescribed saturation determiner 244 and linked to a magenta threshold calculator 250, a yellow threshold calculator 251, and a black threshold calculator 252. The tone converter 24 further includes a threshold reader 242 linked with a dither matrix memory 241 and linked to a cyan comparator 246, a magenta comparator 247, a yellow comparator 248, and a black comparator 249.

The color image determiner 243 is operable to determine whether or not mapped print job data input as image data is color image data. More specifically, the color image determiner 243 identifies the input image data as color image data, when C, M, Y, and K components of the mapped print job data are related to the piece of information given as an instruction for a color printing. It is noted that the color image determiner 243 may determine whether or not the input image data is color image data based on component ratios of the C, M, Y, and K components.

When the mapped print job data input as image data is determined as being color image data by the color image determiner 243, the prescribed saturation determiner 244 is operated. In this operation, the prescribed saturation determiner 244 determines, for a coordinate position of a respective pixel in the mapped print job data, whether or not the color saturation is greater than a prescribed saturation value of a tinted composite black.

There is a family of colors including a group of black colors, gray scale colors, and white colors each having one or more color components (of C, M, and Y components) other than K components added to a K component. The color family includes another group of black colors, gray scale colors, and white colors each having C, M, and Y components added to a K component. In the present embodiment, colors in this family are referred to as composite blacks. Composite blacks to be employed in this example of the embodiment belong to the group of black, gray scale, and white colors each having C, M, Y and K components mixed together.

Specific discussions about the prescribed saturation value will be given. For instance, in a print region such as a letter print region, colors to be output may be intended to be black or gray even in a color printing, or desired to be black or gray with slight reddish or bluish tints. In such a case, a respective output color may have only a K component, or one or more color components (of C, M, and Y components) added to a K component. Or else, it may have C, M, and Y components superimposed on a K component to provide either a black or gray color or a black or gray color shaded with a reddish or bluish tint.

In view of such situations, experiments are made in advance trying to change the luminance and hue at a coordinate position of a respective pixel in various manners. The experiments involve printing various regions including letter print regions and character regions, by employing recording mediums as well as recording agents such as an ink to be used in an actual printing after delivery. Such experiments are repeated in the course of determining a comfortable saturation for a tinted composite black to be free from feelings of strangeness. The prescribed saturation determiner 244A has a set of thus determined saturation values set thereto. It is noted that the prescribed saturation value may be determined on bases of comparisons with regions other than a concerned letter print region or character image region in a color script.

The threshold calculation controller 245 is operated for a coordinate position of a respective pixel, when the color saturation is determined to be greater than a prescribed saturation value by the prescribed saturation determiner 244. In this operation, the threshold calculation controller 245 serves to change a threshold associated with the coordinate position to be different in correspondence to a color component value associated with the coordinate position.

More specifically, the threshold calculation controller 245 is operated when a coordinate position (I, J) (corresponding to a pixel of on a C, M, Y, or K plane) of mapped print job data is determined as having a greater saturation than a prescribed saturation by the prescribed saturation determiner 244. In this operation, the threshold calculation controller 245 serves for controlling the magenta, yellow, or black threshold calculator 250, 251, or 252 to change a threshold in a dither matrix to be compared with a color component associated with the coordinate position (I, J). On the other hand, unless the coordinate position (I, J) is determined as having a greater saturation than the prescribed saturation by the prescribed saturation determiner 244, the threshold calculation controller 245 serves otherwise. That is, the threshold calculation controller 245 then serves for controlling the magenta, yellow, or black threshold calculator 250, 251, or 252 not to change the threshold in the dither matrix to be compared with the color component associated with the coordinate position (I, J) in the mapped print job data.

Figure 3:
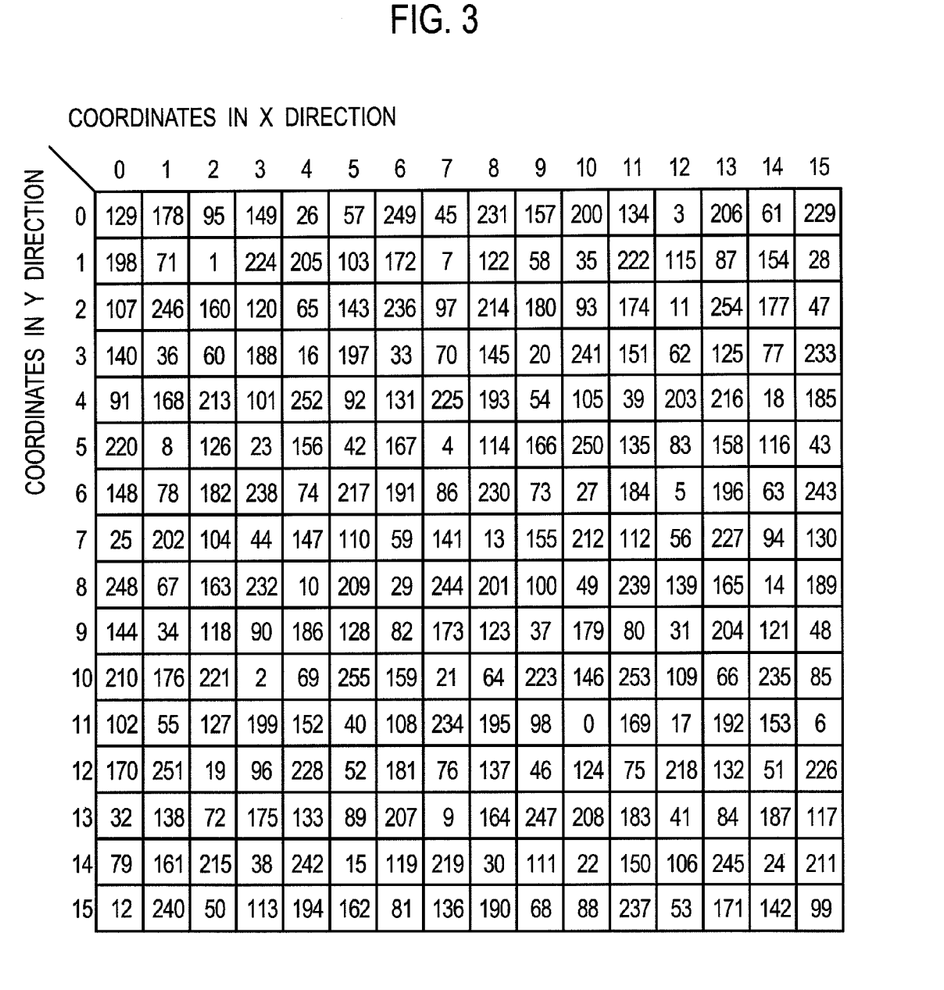
FIG. 3 is a diagram showing a dither matrix according to the first embodiment

The dither matrix memory 241 has a storage area for storing a single dither matrix. In this example of embodiment, there is stored a dither matrix having thresholds arrayed, for instance, in a matrix of a size of 16-row by 16-column, as illustrated in FIG. 3.

The threshold reader 242 is operable to read a threshold in a stored dither matrix associated with a coordinate position (I, J) of mapped print job data. The read threshold belongs to a set of data on C, M, Y, or K component of mapped print job data produced by an operation of the RGB-CMYK converter 23. More specifically, the threshold reader 242 serves to associate a coordinate position (Xi, Yj) of the dither matrix with a coordinate position (I, J) of the mapped print job data. The threshold reader 242 sends to the cyan comparator 246 a combination of a threshold and a component value. The threshold is associated with the coordinate position (Xi, Yj) of the dither matrix. The component value is associated with the coordinate position (I, J) of the mapped print job data corresponding to the coordinate position (Xi, Yj).

The cyan comparator 246 is operable to make a comparison between a C component value and a threshold. The C component value is associated with a coordinate position (I, J) of mapped print job data from (image data input as) mapped print job data produced by a conversion at the RGB-CMYK converter 23. The threshold is associated with a coordinate position (Xi, Yj) of a dither matrix. As a result of the comparison, when the C component value is greater than the threshold, the cyan comparator 246 operates to provide a C component value '1' associated with a coordinate position (I, J) of image data to be output. Unless the C component value is greater than the threshold, the cyan comparator 246 operates to provide a C component value '0' associated with the coordinate position (I, J) of image data to be output.

The magenta threshold calculator 250 is operable when instructed from the threshold calculation controller 245 to change a threshold in a dither matrix. In this operation, the magenta threshold calculator 250 subtracts a C component value from the threshold. The threshold is associated with a coordinate position (Xi, Yj) of a dither matrix. The C component value is associated with a coordinate position (I, J) of mapped print job data. The subtraction is made to calculate the difference to provide as a threshold to be compared with an M component value associated with the coordinate position (I, J) of mapped print job data. If the calculated threshold is a negative value, the magenta threshold calculator 250 adds thereto a maximum value '255' in the matrix to provide a resultant value as the above-noted threshold. This process of adding the maximum value '255' when a calculated threshold is given as a negative, is likewise applied to the yellow threshold calculator 251 and the black threshold calculator 252 to be described later on.

The magenta threshold calculator 250 is operable also when instructed from the threshold calculation controller 245 not to change the threshold in the dither matrix. In this operation, the magenta threshold calculator 250 makes a calculation to provide the threshold associated with the coordinate position (Xi, Yj) of the dither matrix, as it is unchanged. This threshold is given as a threshold to be compared with an M component value associated with the coordinate position (I, J) of mapped print job data. The magenta threshold calculator 250 executes such a threshold calculation process when instructed from the threshold calculation controller 245 not to change a threshold in a dither matrix. This process is likewise applied to the yellow threshold calculator 251 and the black threshold calculator 252, as will be described.

The magenta comparator 247 is operable to make a comparison between an M component value and a threshold. The M component value is associated with a coordinate position (I, J) of mapped print job data from mapped print job data produced by a conversion at the RGB-CMYK converter 23. The threshold is calculated by the magenta threshold calculator 250. The magenta comparator 247 operates to provide an M component value associated with a coordinate position (I, J) of image data to be output in accordance with a result of the comparison. This output process is similar to that of the cyan comparator 246, and detailed description is omitted. It is noted that this output process is similar also to those of the yellow comparator 248 and the black comparator 249 described later on.

The yellow threshold calculator 251 is operable when instructed from the threshold calculation controller 245 to change a threshold in a dither matrix. In this operation, the yellow threshold calculator 251 subtracts an M component value from the threshold. The threshold is calculated by the magenta threshold calculator 250. The M component value is associated with a coordinate position (I, J) of mapped print job data. The subtraction is made to calculate the difference to provide as a threshold to be compared with a Y component value associated with the coordinate position (I, J) of mapped print job data.

The yellow comparator 248 is operable to make a comparison between a Y component value and a threshold. The Y component value is associated with a coordinate position (I, J) of mapped print job data from mapped print job data produced by a conversion at the RGB-CMYK converter 23. The threshold is calculated by the yellow threshold calculator 251. The yellow comparator 248 operates to provide a Y component value associated with a coordinate position (I, J) of image data to be output in accordance with a result of the comparison.

The black threshold calculator 252 is operable when instructed from the threshold calculation controller 245 to change a threshold in a dither matrix. In this operation, the black threshold calculator 252 subtracts a Y component value from the threshold. The threshold is calculated by the yellow threshold calculator 251. The Y component value is associated with a coordinate position (I, J) of mapped print job data. The subtraction is made to calculate the difference to provide as a threshold to be compared with a K component value associated with the coordinate position (I, J) of mapped print job data.

The black comparator 249 is operable to make a comparison between a K component value and a threshold. The K component value is associated with a coordinate position (I, J) of mapped print job data from mapped print job data produced by a conversion at the RGB-CMYK converter 23. The threshold is calculated by the black threshold calculator 252. The black comparator 249 operates to provide a K component value associated with a coordinate position (I, J) of image data to be output in accordance with a result of the comparison.

The foregoing description has discussed a method of changing a threshold in a dither matrix to make the threshold different in correspondence to a color component value associated with a coordinate position of mapped print job data. The method discussed is employed as the coordinate position has a greater saturation than prescribed. It is noted that this method is described as an example of embodiment. There may well be other examples.

The printer 25 is adapted to make a print on a print sheet in accordance with image data output thereto after a conversion at the tone converter 24. The printer 25 used may be a stencil printer, an inkjet printer, or an electro-photographic printer, for instance. Description is now made of an inkjet printer as a specific example. In this case, the printer 25 includes a head unit composed of inkjet heads addressed to C, M, Y, and K component values. This printer 25 includes a sheet transfer system provided with a sheet feeder for feeding a print sheet, and a sheet discharger for discharging a print sheet printed with ink droplets propelled from the head unit. The printer 25 is adapted to control propelling ink droplets from the inkjet heads to form images of script data at prescribed locations on a print sheet fed from the sheet feeder. This control is implemented for C, M, Y, and K component values at a respective coordinate position of image data output from the tone converter 24.

[Printing Method]

Figure 4:
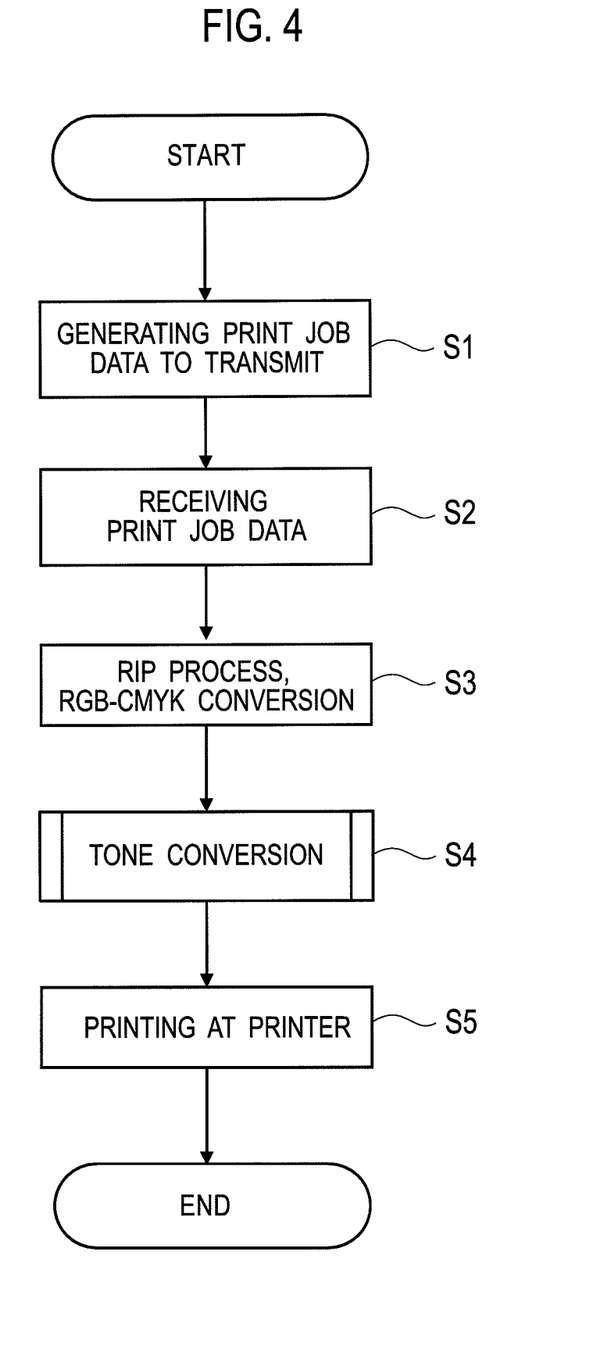
FIG. 4 is a flowchart for explanation of a printing method according to the first embodiment.

There will be described a printing method using the above printing system, with reference to a flowchart in FIG. 4.

At a step S1, print job data is generated at a terminal device 10 and transmitted to the printing device 20. More specifically, an application 11 is operated to prepare script data. The print job data is generated by the printer driver 12 from the script data and information (including e.g. pieces of information instructing a color printing) input in accordance with displayed contents such as those on a print setup screen. The print job data transmitter 14 transmits such print job data through the communicating subsystem 15 to the printing device 20.

At a step S2, in the printing device 20, the print job data receiver 21 receives transmitted print job data, and sends it to the RIP processor 22.

At a step S3, the sent print job data undergoes a RIP process at the RIP processor 22 and an RGB-to-CMYK conversion at the RGB-CMYK converter 23. More specifically, the RIP processor 22 maps the print job data into bit maps of R, C, and B components in a prescribed resolution, to generate mapped print job data. Then, the RGB-CMYK converter 23 converts the mapped print job data defined by R, Cc and B components into mapped print job data defined by C, M, Y, and K components.

The mapped print job data generated by a conversion at the RGB-CMYK converter 23 has data of C, M, Y, and K components, which are defined within a range of 256 tones. At a step S4, the 256-tone mapped print job data (refereed herein to as input image data) is processed at the tone converter 24, where it is tone-converted into image data to be output in two tones. This processing will be discussed later on into details.

At a step S5, tone-converted image data is output from the tone converter 24, and input to the printer 25, where it is processed to make a print on a print sheet. The printer 25 thus outputs a print based on the output image data.

Figure 5:
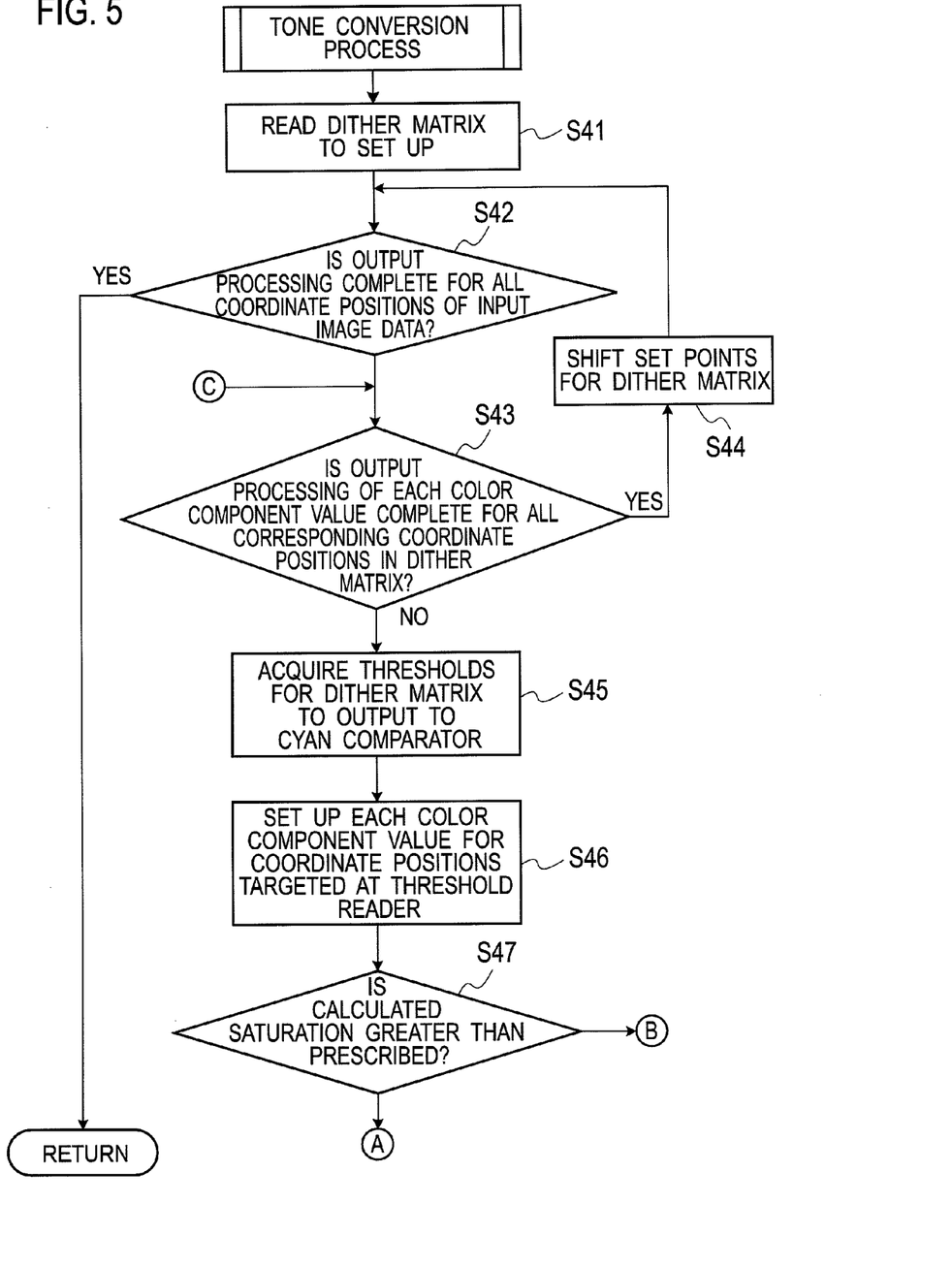
FIG. 5 is a flowchart for explanation of a tone conversion process according to the first embodiment.
Figure 6:
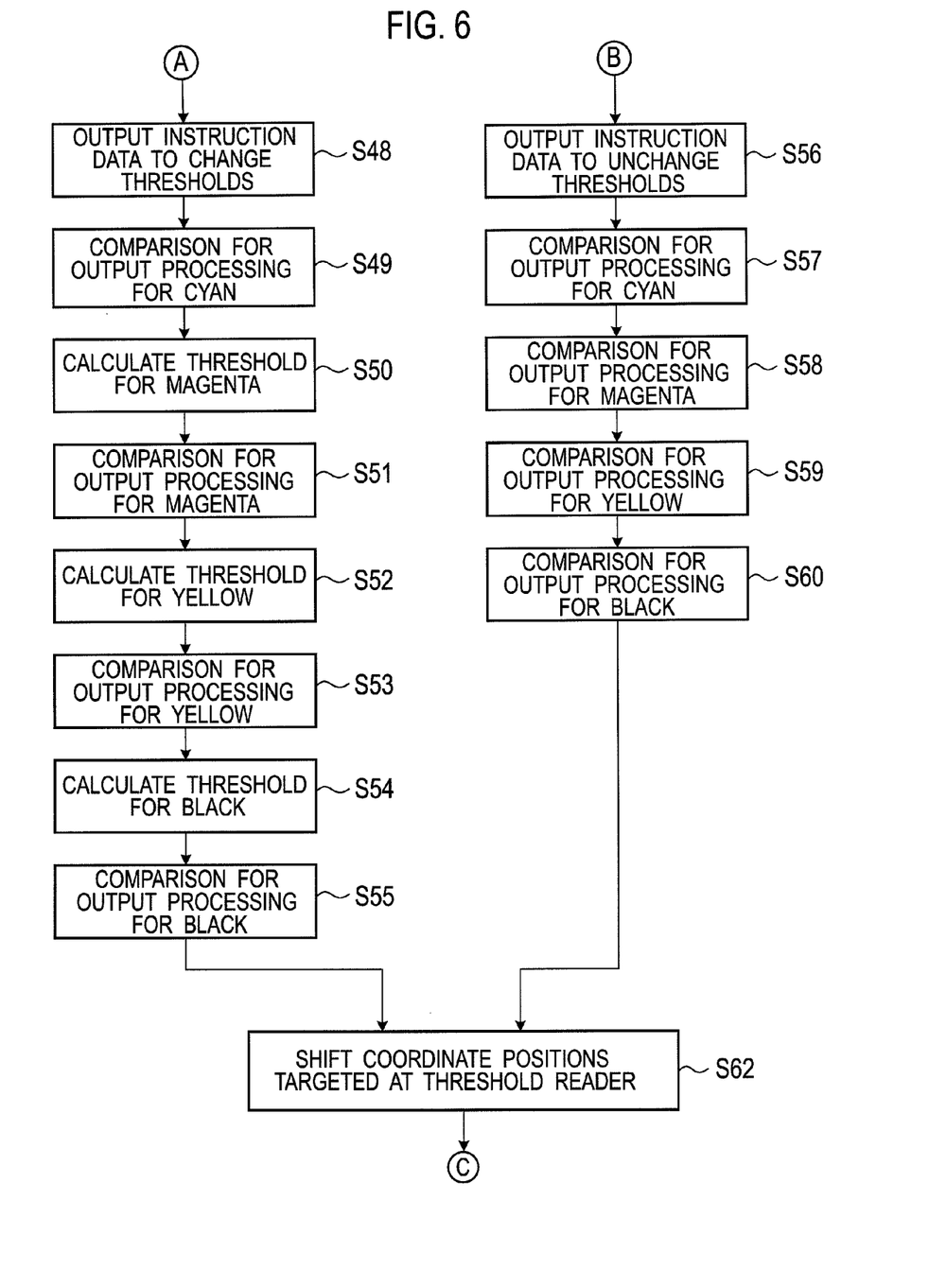
FIG. 6 is a continued flowchart for explanation of the tone conversion process according to the first embodiment.

Description is now made into details of the tone conversion process at the tone converter 24, with reference to flow charts in FIG. 5 and FIG. 6. This tone conversion process starts when input image data is determined to be color image data at the color image determiner 243.

At a step S41, the threshold reader 242 reads a dither matrix from the dither matrix memory 241, and enters a setup process. For this example of tone conversion process, description is made with reference to the dither matrix illustrated in FIG. 3. This dither matrix has an array of thresholds set to positions of matrix coordinates. The matrix coordinate positions are each represented by a combination of a position Xi (i=0, 1, ..., 15) in an X direction and a position Yj (j=0, 1, ..., 15) in a Y direction. The threshold reader 242 serves to associate coordinate positions of the read dither matrix with coordinate positions of input image data, as necessary. For instance, when using such a dither matrix as illustrated in FIG. 3, the threshold reader 242 associates coordinate positions (Xi, Yj) of the dither matrix element-wise with a subset of coordinate positions (I, J) of the input image data. Then, the threshold reader 242 holds information on coordinate positions of input image data associated with coordinate positions of the dither matrix (for instance, such that (I, J) (0, 0), (1, 0), ..., (15, 15)).

At a step S42, the threshold reader 242 determines whether or not an output processing is completed of respective color component values at all coordinate positions of the input image data. The tone conversion process goes to an end if the output processing is completed of respective color component values at all coordinate positions of the input image data. Unless the output processing is completed of respective color component values at all coordinate positions of the input image data, the tone conversion process goes to a step S43.

In this example, the threshold reader 242 is operative to associate respective coordinate positions (Xi, Yj) of the dither matrix element-wise with a subset of coordinate positions (I, J) of the input image data. In this case, at the step S43, the threshold reader 242 determines whether or not the output processing is completed of respective color component values for all associated coordinate positions. If the output processing is completed of respective color component values for all associated coordinate positions, the tone conversion process goes to a step S44. Unless the output processing is completed of respective color component values for all associated coordinate positions, the tone conversion process goes to a step S45.

At the step S44, the threshold reader 242 again associates coordinate positions of the read dither matrix with respective coordinate positions of input image data. More specifically, the threshold reader 242 determines coordinate positions (Xi, Yj) of thresholds in the dither matrix to be read in correspondence to respective coordinate position (I, J) of the input image data. This is done such that Xi=I mod 16 and Yj=J mod 16, where mode represents a remainder. After the re-association, the threshold reader 242 again enters the step S42.

At the step S45, the threshold reader 242 acquires a coordinate position (Xi, Yj) of the dither matrix associated with a target coordinate position (I, J) of the input image data to which a threshold of the dither matrix is to be applied. The threshold reader 242 reads the threshold corresponding to the coordinate position (Xi, Yj). Then, the threshold reader 242 sends to the cyan comparator 246 the threshold corresponding to the coordinate position (Xi, Yj) and the target coordinate position (I, J) of the input image data.

More specifically, the threshold reader 242 follows the order of coordinate positions ((0, 0), (1, 0), ... ) in the dither matrix, to send thresholds (129, 178, ... ) associated with the coordinate positions and target coordinate positions ((0, 0), (1, 0), ... ) of the input image data to the cyan comparator 246 and the magenta threshold calculator 250.

At a step S46, the threshold reader 242 sets up respective color component values corresponding to the target coordinate position of the input image data. More specifically, the threshold reader 242 first sets up (0, 0) as a coordinate position. Next, the threshold reader 242 makes the comparators 246, 247, 248, and 249 for C, M, Y, and K components set up color component values (C, M, Y, and K component values) associated with the coordinate position (0, 0), respectively. Further, at a later-described step S62, when the target coordinate position is updated by the threshold reader 242, the threshold reader 242 re-sets color component values for the updated coordinate position.

At a step S47, the prescribed saturation determiner 244 calculates a color saturation of a target coordinate position based on respective color component values of the target coordinate position set up at the step S6. The prescribed saturation determiner 244 determines whether or not the calculated saturation is greater than a prescribed saturation of a tinted composite black. If the calculated saturation is greater than the prescribed saturation, the tone conversion process goes to a step S48. Unless the calculated saturation is greater than the prescribed saturation, the tone conversion process goes to a step S56.

At the step S48, the threshold calculation controller 245 provides threshold change instruction data as an instruction to change a threshold in the dither matrix. This instruction data is sent to the magenta threshold calculator 250, yellow threshold calculator 251, and black threshold calculator 252.

At a step S49, the cyan comparator 246 performs a cyan comparison process and a cyan component value output processing. The cyan comparator 246 makes a comparison between a C component value and a threshold. The C component value is associated with a target coordinate position (I, J) of the input image data produced by a conversion at the RGB-CMYK converter 23. The threshold is associated with a coordinate position (Xi, Yj) of the dither matrix. As a result of the comparison, if the C component value is greater than the threshold, the cyan comparator 246 provides a C component value '1' associated with a coordinate position (I, J) of image data to be output. If the C component value is smaller than the threshold, the cyan comparator 246 provides a C component value '0' associated with the coordinate position (I, J) of image data to be output. Then, the cyan comparator 246 informs the threshold reader 242 of that it has output a C component value associated with the coordinate position (I, J) of output image data. This processing is similar also to those in a comparison for an output processing for magenta, a comparison for an output processing for yellow, and a comparison for an output processing for black to be described later on.

At a step S50, the magenta threshold calculator 250 operates based on the threshold change instruction data to change a threshold to be applied to an M component value at a target coordinate position of the input image data. More specifically, the magenta threshold calculator 250 subtracts a C component value from the threshold. The threshold is associated with a coordinate position (Xi, Yj) of the dither matrix. The C component value is associated with the target coordinate position (I, J) of the input image data. The subtraction is made to calculate the difference to provide as a threshold to be compared with an M component value associated with the target coordinate position (I, J) of the input image data.

At a step S51, the magenta comparator 247 performs a magenta comparison process and a magenta component value output processing. The magenta comparator 247 makes a comparison between an M component value and a threshold. The M component value is associated with a target coordinate position (I, J) of the input image data produced by a conversion at the RGB-CMYK converter 23. The threshold is calculated by the magenta threshold calculator 250. The magenta comparator 247 provides an M component value associated with a coordinate position (I, J) of image data to be output in accordance with a result of the comparison.

At a step S52, the yellow threshold calculator 251 operates based on the threshold change instruction data to change a threshold to be applied to a Y component value at a target coordinate position. More specifically, the yellow threshold calculator 251 subtracts an M component value from the threshold. The threshold is calculated by the magenta threshold calculator 250. The M component value is associated with the target coordinate position (I, J). The subtraction is made to calculate the difference to provide as a threshold to be compared with a Y component value associated with the target coordinate position (I, J).

At a step S53, the yellow comparator 248 performs a yellow comparison process and a yellow component value output processing. The yellow comparator 248 makes a comparison between a Y component value and a threshold. The Y component value is associated with a target coordinate position (I, J) from the input image data produced by a conversion at the RGB-CMYK converter 23. The threshold is calculated by the yellow threshold calculator 251. The yellow comparator 248 provides a Y component value associated with a coordinate position (I, J) of image data to be output in accordance with a result of the comparison.

At a step S54, the black threshold calculator 252 operates based on the threshold change instruction data to change a threshold to be applied to a K component value at a target coordinate position. More specifically, the black threshold calculator 252 subtracts a Y component value from the threshold. The threshold is calculated by the yellow threshold calculator 251. The Y component value is associated with the target coordinate position (I, J). The subtraction is made to calculate the difference to provide as a threshold to be compared with a K component value associated with the target coordinate position (I, J).

At a step S55, the black comparator 249 performs a black comparison process and a black component value output processing. The black comparator 249 makes a comparison between a Y component value and a threshold. The Y component value is associated with a target coordinate position (I, J) from the input image data produced by a conversion at the RGB-CMYK converter 23. The threshold is calculated by the black threshold calculator 252. The black comparator 249 provides a K component value associated with a coordinate position (I, J) of image data to be output in accordance with a result of the comparison. The threshold reader 242 acquires information from the comparators 246, 247, 248, and 249 for cyan, magenta, yellow, and black that they have output respective component values associated with the coordinate position (I, J) of image data to be output. Then, the threshold reader 242 enters the step S62.

Figure 7:
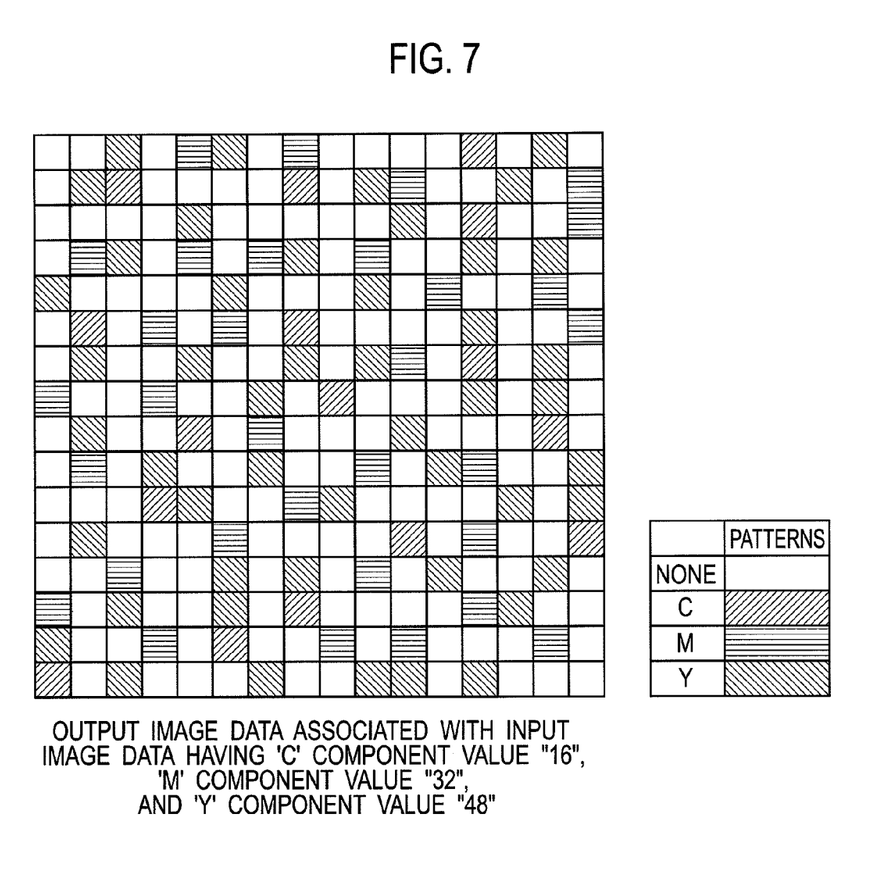
FIG. 7 is an illustration of an example of image data to be output according to the first embodiment.

FIG. 7 shows an illustration of image data output through the steps S48 to S55 under application of the above-noted dither matrix. This example was obtained from input image data having color component values associated with all coordinate positions, including C component values '16', M component values '32', and Y component values '48' (K components were omitted).

At the step S56, the threshold calculation controller 245 provides threshold unchange instruction data as an instruction not to change a threshold in the dither matrix. This instruction data is sent to the magenta threshold calculator 250, yellow threshold calculator 251, and black threshold calculator 252. The magenta, yellow, and black threshold calculators 250, 251, and 252 are thus controlled to have thresholds unchanged. As a result, those thresholds to be applied to respective color component values at the target coordinate position of the input image data are sent, as they are, to the magenta, yellow, and black comparators 247, 248, and 249, respectively.

At steps S57 through S60, the cyan, magenta, yellow, and black comparators 246, 247, 248, and 249 perform their comparison processes and component value output processing for C, M, Y, and K components. Then, the threshold reader 242 enters the step S62.

At the step S62, the threshold reader 242 shifts the current target coordinate position of input image data in the X direction, to set up a subsequent coordinate position as a target. For instance, assuming the coordinate position (0, 0) as a currently set target, the coordinate position (1, 0) comes next as a target to be set when the steps S48 to S55 are completed. If the coordinate position (15, 0) is a current target, the coordinate position (0, 1) is to be set as a subsequent target, when the steps S48 to S55 are completed. That is, the dither matrix has a coordinate position shifted in the X direction to apply to raster data till it comes around to an initially applied position. At this position, the coordinate position to be applied is once shifted in the Y direction, before again shifting in the X direction.

It is noted that the step S44 may be substituted with a modified step. More specifically, the threshold reader 242 may read a coordinate position of the dither matrix, and associate it with a coordinate position of the input image data shifted by '16' in the X direction. That is, the dither matrix may have a coordinate position (Xi, Yj) therein associated with a coordinate position (I+16, J) of the input image data. And, when the coordinate position of the input image data associated with the coordinate position (Xi, Yj) of the dither matrix has come to an end in the X direction, the coordinate position (Xi, Yj) next to come in the dither matrix may be associated with a coordinate position (I, J+16) of the input image data. That is, the dither matrix has a coordinate position shifted in the X direction to apply to a coordinate position of the input image data till it comes around to an initially applied position. And, at this position, the coordinate position to be applied is once shifted in the Y direction, before again shifting in the X direction.

Figure 8:
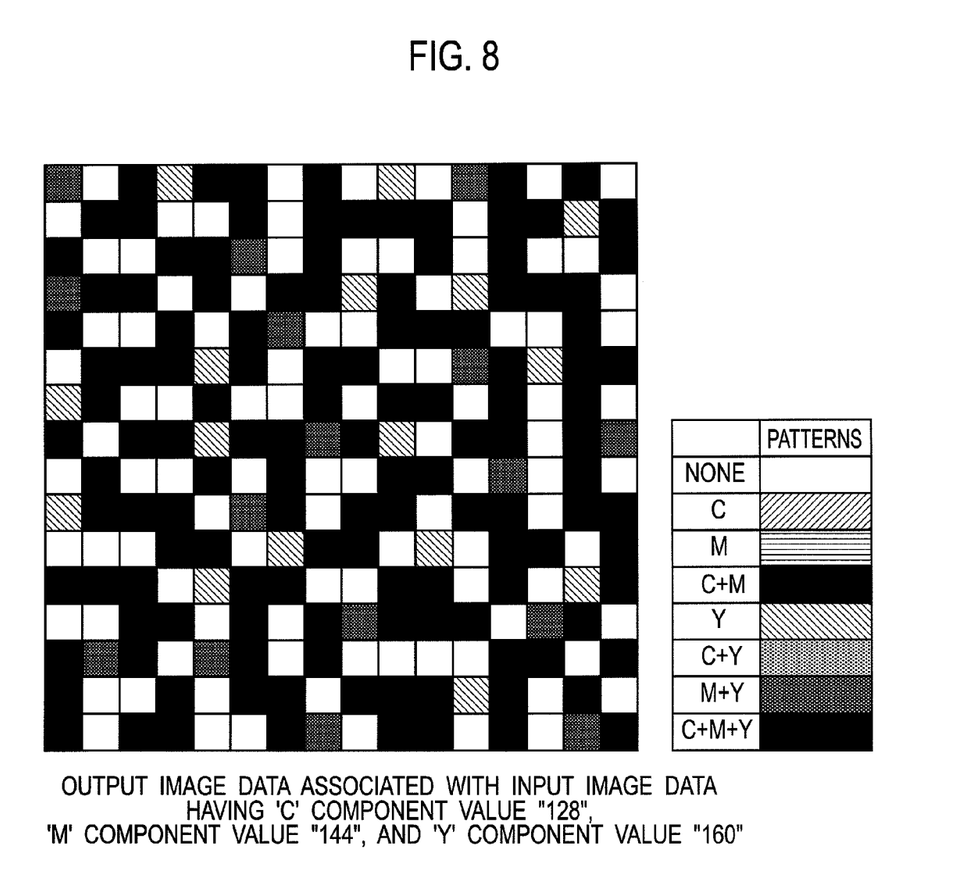
FIG. 8 is an illustration of another example of image data to be output according to the first embodiment.

FIG. 8 shows an illustration of image data output through the steps S56 to S60 under application of the above-noted dither matrix. This example was obtained from input image data having color component values associated with all coordinate positions, including C component values '128', M component values '144', and Y component values '160' (K components were omitted).

[Functions]

According to the embodiment of the present invention, after a determination that input image data should be color data, it is determined whether or not (a pixel at) a respective coordinate position of the input image data has a color saturation greater than a prescribed saturation of a tinted composite black. When the color saturation is determined as being greater than the prescribed saturation, thresholds associated with the coordinate position are changed. The thresholds are changed to be different in correspondence to respective color component values associated with the coordinate position. Changed thresholds are compared with respective color components. And, results of the comparisons are based on to generate color component values constituting image data to be output for the coordinate position. In general, color image data undergoes a subtractive color mixing. Different colors superimposed on a coordinate position may fail to produce a favorable color, as the degree of superimposition increases, with development of unclearness debasing the quality of color printing. This is significant in particular at regions having relatively high saturations. To this point, according to this embodiment, thresholds in dither matrix are varied in accordance with color components at target coordinate positions, in particular at regions having relatively high saturations. Accordingly, the foregoing inconvenient issues are avoidable.

Further, when the color saturation is determined as being greater than prescribed, the foregoing measures afford to avoid having color components spread on a coordinate position in a region of which saturation is as low as a tinted composite black. As a result of this, it is possible to prevent pixels from getting black with excessive reddish or bluish tints, appearing as prominent debasements of image property such as in letter print regions. Specific examples follow.

When the color saturation is determined as not being greater than prescribed, respective color component values of the coordinate position are compared with thresholds associated with the coordinate position. And, results of the comparisons are based on to generate respective color components constituting image data to be output for the coordinate position. Hence, the following measures are applicable to print regions such as a letter print region in which colors to be output are intended to be black or gray even in a color printing, or desired to be black or gray with slight reddish or bluish tints. That is, in regions of which saturation is as low as a tinted composite black, thresholds of a dither matrix are fixed irrespective of color component values of a target coordinate position. This affords color components to be superimposed on a coordinate position. As a result, those coordinate positions having hues such as those of C components are kept even from being eye-catching or getting black with excessive reddish or bluish tints. They are kept also from appearing as prominent debasements of image property such as in letter print regions.

It is therefore possible to implement a suppressing control by using a single dither matrix. This control covers suppressing unclearness (with a color dulling and a granular feeling) due to superimposed colors in a color print. It further includes suppressing prominent tints, as necessary, at low-saturation regions near black or gray colors.

In this embodiment, when the color saturation is determined as not being greater than prescribed, thresholds in a dither matrix are kept unchanged for respective color component values on a coordinate position, as described. It is noted that this example is not restrictive. For instance, there may be a technique of changing thresholds of a dither matrix for respective color components on a coordinate position in a half region of mapped print job data. This technique should be combined with a technique of retaining thresholds of the dither matrix unchanged for respective color components on a coordinate position in the other half region of the mapped print job data. In this case, there may be use of random numbers or such for stochastic variations in the half region.

Further, when the color saturation is not determined as not being greater than prescribed, it may be determined whether or not a threshold of the dither matrix should be changed for color component values on a coordinate position, in accordance with a type of an object region. For instance, the threshold may be fixed in regions of a picture object and an illustration object among a family of objects including picture objects, letter objects, and illustration objects. The threshold may be changed in regions of a letter object. Even when doing so, it is possible to suppress unclearness (with a color dulling and a granular feeling) due to superimposed colors in a color print. It also is possible to suppress prominent tints at low-saturation regions near black or gray colors. In addition, it is possible to change the degree of suppression to prominent tints in accordance with object regions among low-saturation regions near black or gray colors.

Second Embodiment

For monochrome image data of script data to be processed for a composite black print mode, color component values are to be determined every coordinate position like color image data. This embodiment describes how to set up thresholds of a dither matrix to apply to CMYK color components in such a case. It is noted that configurations and processes identical or similar to those in the first embodiment are designated at identical reference signs, omitting redundancy.

(Configuration of the Printing System)

The preparation of script data by an application 11 can be followed by a user's operation using an I/O interface 13 to input an instruction to print the script data as a monochrome print. In this case, a printer driver 12 outputs on the I/O interface 13 a screen requesting the user to select one of a composite black print mode and a pure black print mode. If the composite black print mode is selected, the printer driver 12 operates to include in associated print job data a piece of information instructing a monochrome print mode combined with the composite black print mode.

A threshold calculation controller 245 is operated with mapped print job data given as monochrome image data to be printed by the composite black print mode. In this operation, the threshold calculation controller 245 makes a control not change thresholds associated with a respective coordinate position in correspondence to color component values associated with the coordinate position.

(Printing Method)

In the flowcharts of FIG. 5 and FIG. 6, a step S46 is followed by a series of steps S56, S57, S58, S59, S60, and S62, omitting the steps S47, S48, S49, S50, S51, S52, S53, S54, and S55 in the first embodiment. In description of the first embodiment, input image data reads monochrome image data with an option of the composite black print mode.

[Functions]

According to this embodiment, a composite black print mode is selective to print monochrome image data. In this case, respective color component values of a coordinate position constituting image data to be output are generated on bases of comparisons between thresholds associated with coordinate positions (pixels) of input image data and color component values of the coordinate positions. Hence, like the first embodiment, the following measures are applicable to print regions such as a letter print region in which colors to be output are intended to be black or gray, or desired to be black or gray with slight reddish or bluish tints. That is, thresholds of a dither matrix are fixed in correspondence to respective color components on an identical coordinate position. As a result, respective color components are superimposed on a coordinate position. Those coordinate positions having hues such as those of C components are kept even from being eye-catching or getting black with excessive reddish or bluish tints. They are kept also from appearing as prominent debasements of image property such as in letter print regions. Further, color components superimposed on a coordinate position allows for an enhanced black density as necessary in the monochrome print.

Modifications

In the embodiments described, thresholds of a dither matrix and C, M, Y, and K component values of coordinate positions of input image data are compared, to provide image data to be output as binary data. This example is not restrictive. There may be output data multi-valued to be three or more values.

In this regard there is known document: Journal of Electronic Imaging 8(3), pp 31-3211 (July 1999), which has disclosed an expression (1) letting p=256, q=6, such that $$o(x,y)=INT[i(x,y)/51+M(x,y)/256] \qquad (1),$$

where i(x, y) is an input tone of a C component value or such, o(x, y) is an output tone, and M(x, y) is a threshold.

There may be a tone converter 24 adapted to meet the expression (1) above, to provide output data multi-valued to be two or more values.

In the embodiments described, input image data is changed to output mage data by a conversion from N pixels to N pixels. There may be use an area tone system to change input image data to output mage data by a conversion from 1 pixel to N pixels. In this case, the tone converter 24 may be configured to keep a pseudo tone.

The second embodiment may include detectors for detecting residual amounts of C, M, Y, and K recording agents (as ink or toner). In this case, the composite black printing may be automatically entered when the K residual amount is decreased under prescribed value.

The present invention has been described by employing the first and second embodiments and modifications. It is noted that discussions and drawings constituting part of the disclosure are in no way restrictive to the invention. The present invention is applicable to various substitute forms, embodiments, and techniques for use.

The present application claims the benefit of priority under 35 U.S.C. §119 to Japanese Patent Application No. 2011-079734, filed on Mar. 31, 2011, the entire content of which is incorporated herein by reference.

What is claimed is:

1. An image processor adapted to generate image data to be output as necessary for printing, based on comparisons between pixels of input image data and thresholds in a dither matrix associated with the pixels, the image processor comprising:

a color image determiner configured to determine whether or not the input image data is color image data;

a prescribed saturation determiner configured to determine whether or not the respective pixels of the input image data determined as color image data by the color image determiner have a value greater in color saturation than a prescribed saturation value of a composite black;

a threshold changer configured to change a threshold for each color in the dither matrix associated with a pixel determined as having a value greater than the prescribed saturation value by the prescribed saturation determiner to make the threshold different in correspondence to each color component value of the pixel; and a first output pixel data generator configured to generate color component values to be output for the pixel, based on comparisons between the color component values of the pixel and the thresholds changed by the threshold changer.

2. The image processor according to claim 1, wherein the threshold changer is configured to operate, for a pixel as determined as having a value greater than the prescribed saturation value by the prescribed saturation determiner, to repeat a comparison of a color component value of an i-th color (i=1, 2, . . . , N) up to i=N to change a threshold of the (i+1)-th color.

3. The image processor according to claim 1, wherein a first color is cyan and an (N+1)-th color is black.

4. The image processor according to claim 1, further comprising:

a second output pixel data generator configured to generate color component values to be output for a pixel determined as having a value not greater than the prescribed saturation value by the prescribed saturation determiner, based on comparisons between color component values of the pixel and thresholds associated with the pixel.

5. The image processor according to claim 1, further comprising:

a print mode setter configured to set up one of a pure black print mode and a composite black print mode as a print mode of the input image data as determined not to be color image data by the color image determiner; and a third output image data generator configured to generate color components of pixels constituting the image data to be output based on comparisons between color components of the pixels and thresholds of respective pixels of the input image data when set up to the composite black print mode by the print mode setter.

* * * * *